Figure 5:
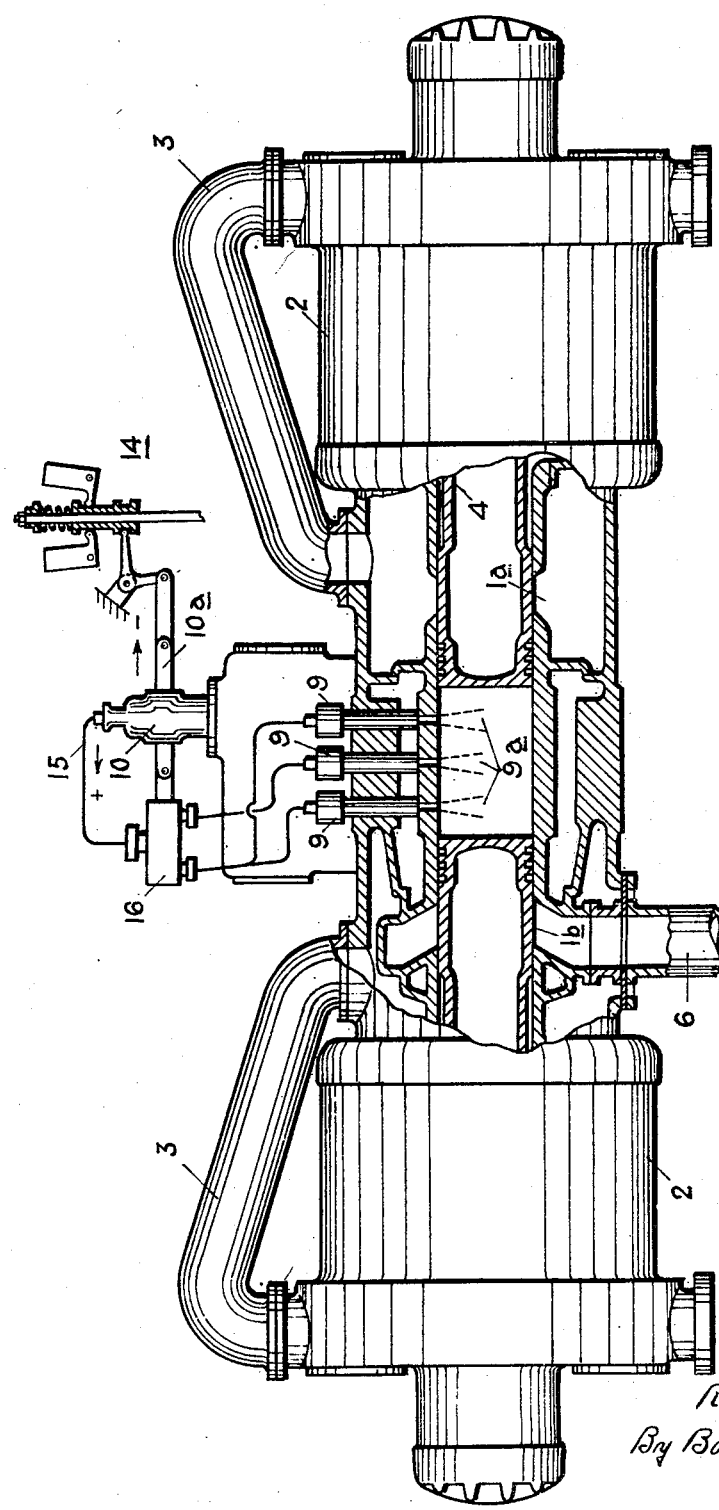

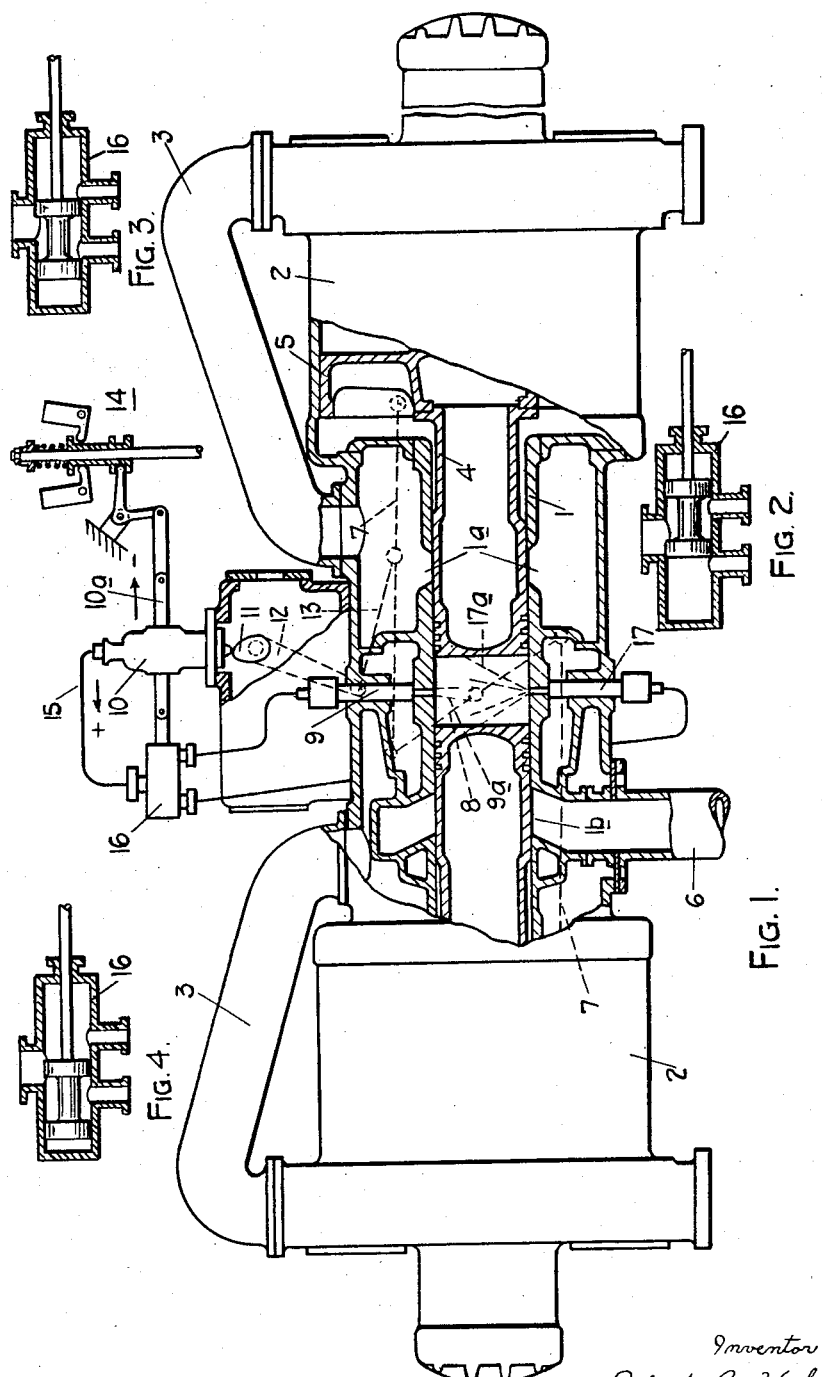

Patented Oct. 9, 1951

2,570,616

UNITED STATES PATENT OFFICE 2,570,616

VARIABLE DISTRIBUTION OF FUEL SPRAY FOR DIRECT FUEL INJECTION INTERNAL-COMBUSTION ENGINES

Robert James Welsh, Rugby, England, assignor to The English Electric Company Limited, London, England, a British company Application October 14, 1947, Serial No. 779,800
In Great Britain September 30, 1942

Section 1, Public Law 690, August 8, 1946
Patent expires September 30, 1962

2 Claims. (Cl. 123—32.6)

This invention relates to the control of the injection of fuel into an internal combustion engine having direct fuel injection, such as a compression ignition engine, which is of the type wherein the length of the compression space in the engine cylinder is variable during the operation of the engine. Such variation occurs in particular in a free piston engine—i. e. a device wherein a reciprocating load which may be a compressor piston is directly connected to or combined with an internal combustion engine piston instead of being driven thereby through connecting rods, cranks and crankshafts.

According to the invention, in an engine of the said type the spread of the spray of injected fuel along the length of the cylinder is increased in automatic response to increase in the quantity of fuel injected per cycle by means independent of any alteration in the compression volume. In other words, greater amounts of fuel are injected with a greater spatial distribution along the cylinder length than smaller amounts of fuel.

The invention is shown by way of example in the accompanying drawings of which Fig. 1 shows a free piston internal combustion engine compressor in elevation, partly in section; Figs. 2, 3 and 4 show a detail in section on a larger scale in three different positions. Fig. 5 shows a modification of the embodiment illustrated in Fig. 1.

Referring to Fig. 1 the free piston engine compressor comprises the engine cylinder 1 with compressor cylinders 2 at opposite ends thereof, within which reciprocate the opposed free piston units each including an engine piston 4 and a compressor piston 5. The compressor cylinders can supply scavenging and charging air through conduits 3 and the ring of inlet ports 1a in the engine cylinder 1, which latter has also the ring of exhaust ports 1b communicating with the exhaust conduit 6.

The reciprocating piston units are synchronised in the usual way by the links 7 pivotally connected to the pistons 5 and to the ends of the lever 8. Fuel is injected by a fuel injector 9 of conventional form supplied with fuel by a fuel injection pump 10 also of conventional form reciprocated by cam 11 which is oscillated in accordance with the movement of the free piston units through the lever 12 and the link 13 connected to a point on one of the links 7. The quantity of fuel injected by each stroke of the injection pump 10 is determined in the usual manner by the position of the fuel rack 10a which may for example be actuated or controlled by a speed governor 14 driven by a turbine or other prime mover to which the compressor device supplies motive fluid, so that an increase in turbine speed will decrease the quantity of fuel injected and vice versa. The fuel goes from pump 10 to injector 9 by way of fuel pipe 15 and distribution valve 16.

In one particular method of carrying out the invention two or more fuel-injection nozzles such as 9 and 17 are provided, all supplied through valve 16. Thus, for example, nozzle 9 may give a flat jet as indicated at 9a while nozzle 17 spaced circumferentially from nozzle 9 around the cylinder gives jets which, as indicated at 17a, are more widely spread along the length of the cylinder. Again, a nozzle such as 9 may be arranged to give a flat jet while one or more further nozzles which may also give flat jets are longitudinally displaced therefrom along the cylinder; the further nozzles may be arranged to function in pairs and be disposed on opposite sides of the nozzle 9 along the length of the cylinder, Fig. 5, this arrangement being more particularly suited to the opposed piston engine shown. Such arrangements of multiple fuel injection nozzles are in themselves known; it has been proposed to control a plurality of nozzles in accordance with the speed of or load on the engine, without variation in spatial distribution, in the case of an engine working with a constant compression volume and also to control a plurality of nozzles—by means actuated either by the piston or pistons towards the end of the compression stroke or by the compression pressure—in dependence on the alteration of the volume of the compression space between the pistons 4 in the case of an engine working with a variable stroke, whereby to vary the spatial distribution in response to said alteration.

In accordance with the present invention, when small quantities of fuel are to be injected, only a nozzle or nozzles such as 9 (giving a flat jet) are in operation. The distributor valve 16 is then in the position shown in Fig. 2. Movement of the fuel rack 10a to the left increases the quantity of fuel injected per cycle through this nozzle or nozzles 9 first of all progressively, until a certain quantity is reached, after which further movement to the left of the rack 10a brings the distributor valve 16 into the position of Fig. 3 in which the more powerful nozzle or nozzles 17 are connected with the fuel pump. Again the quantity supplied by these nozzles is increased by further movement of the rack 10a to the left until both the nozzles 9 and 17 are in operation (Fig. 4). In any case the spatial distribution is dependent on the quantity of fuel injected as determined by the position of the fuel rack 10a and distributor valve 16, and this in turn is controlled quite independently of variations of the inward stroke of the free piston assemblies and hence of the clearance space between the engine pistons 4.

What I claim as my invention and desire to secure by Letters Patent is:

1. A direct fuel injection type internal combustion engine comprising a combustion cylinder, an engine piston adapted to reciprocate in the said cylinder, fuel pumping means, fuel injection means in supply connection with said pumping means adapted to spray the injected fuel along a comparatively restricted length of the combustion cylinder, fuel injection means in supply connection with the said pumping means adapted to spray the injected fuel along a comparatively extended length of the combustion cylinder, control means for the amount of fuel injected, and distributing means associated with the said control means and adapted automatically to connect the said pumping means with the said fuel injecting means adapted to spray the fuel over a comparatively restricted length when the said control means is in a position for comparatively low amount of fuel supply, and with the said fuel injecting means adapted to spray the fuel over a comparatively extended length when the said control means is in a position for comparatively high amount of fuel supply, independently of any alteration in the compression volume.

2. An engine as claimed in claim 1 including distributing means having three consecutive positions, a first position in which it connects the fuel injection means adapted to spray the fuel over a comparatively restricted length only; a second position in which it connects the fuel injection means adapted to spray the fuel over a comparatively extended length only; and a third position in which it simultaneously connects both said fuel injection means with the fuel pumping means.

ROBERT JAMES WELSH.

REFERENCES CITED

The following references are of record in the file of this patent:

UNITED STATES PATENTS

| Number | Name | Date |
|---|---|---|
| 1,127,772 | Junkers | Feb. 9, 1915 |
| 1,464,268 | Keller | Aug. 7, 1923 |
| 2,132,083 | Pateras Pescara | Oct. 4, 1938 |
| 2,147,935 | Steiner | Feb. 21, 1939 |
| 2,182,063 | Steiner | Dec. 5, 1939 |
| 2,200,892 | Pateras Pescara | May 14, 1940 |